UNITED STATES PATENT OFFICE.

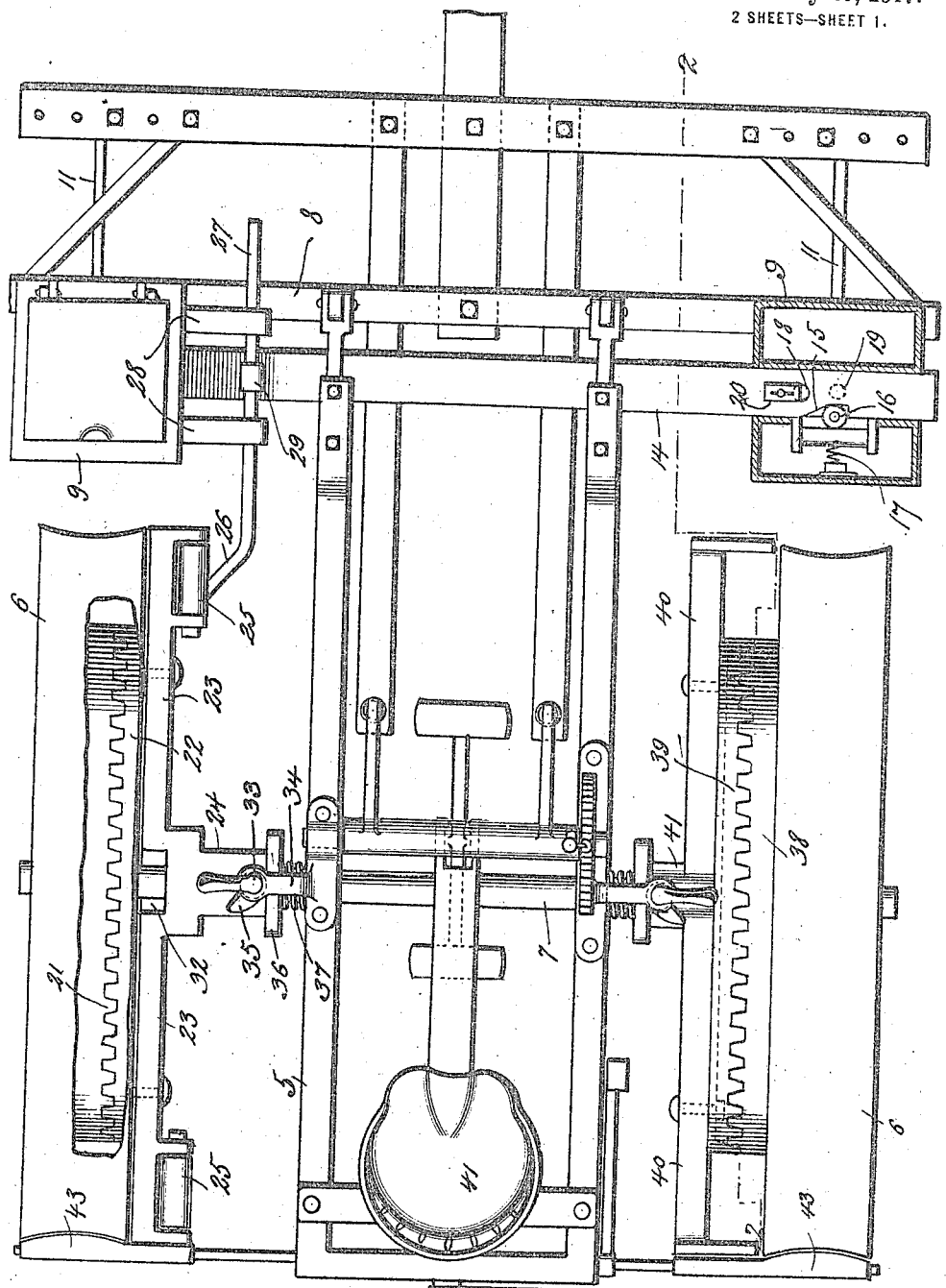

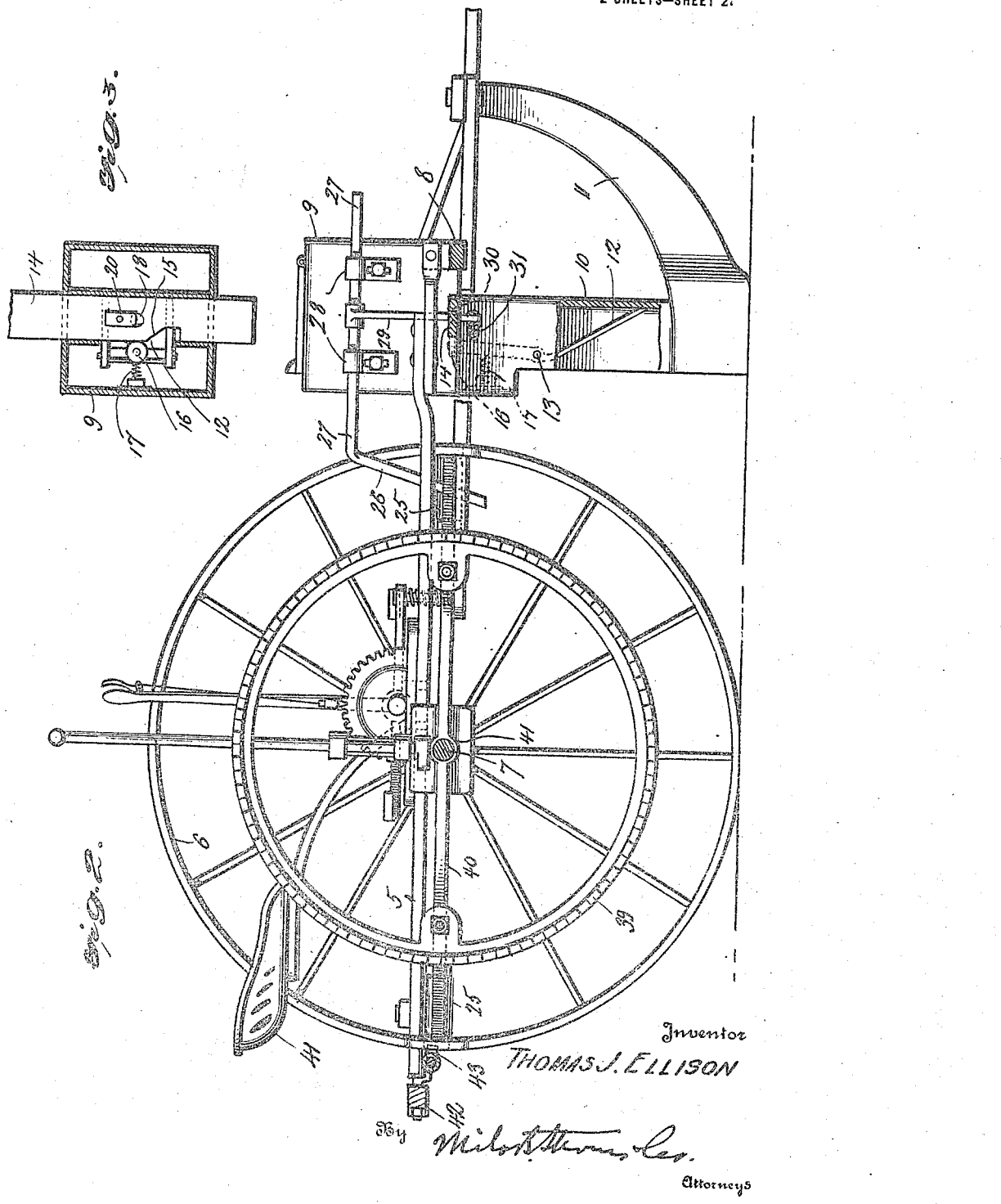

THOMAS J. ELLISON, OF TERRILL, KENTUCKY.

CORN-PLANTER.

1,233,208.  Specification of Letters Patent.  Patented July 10, 1917.

Application filed July 14, 1916. Serial No. 109,292.

*To all whom it may concern:*

Be it known that I, THOMAS J. ELLISON, a citizen of the United States, residing at Terrill, in the county of Madison and State of Kentucky, have invented new and useful Improvements in Corn-Planters, of which the following is a specification.

The machine which is the subject matter of the present application for patent is designed more particularly for planting corn, and the invention has for its object to provide a novel and improved mechanism for correctly dropping the seed at regular spaced intervals, and to effect this result without the use of the wire and other mechanism ordinarily employed in "check-rowing."

The object stated is attained by means of a combination and arrangement of parts to be hereinafter described and claimed, and in order that the same may be better understood, reference is had to the accompanying drawings, forming a part of this specification.

In the drawings,

Figure 1 is a plan view of the machine, with parts broken away and shown in section;

Fig. 2 is a longitudinal section on the line 2—2 of Fig. 1, and

Fig. 3 is a horizontal section of one of the seed boxes.

Referring specifically to the drawings, 5 denotes the main frame of the machine, the same being constructed and arranged in any suitable manner. The frame is mounted on a pair of wheels 6 carried by an axle 7 suitably fixed to the frame. At the front of the main frame is a suitable support 8 carrying the seed boxes 9, two of such being provided as is the common practice.

From each seed box 9 depends a seed chute 10 extending down to a furrow opener 11 as usual. In the seed chute is mounted a valve 12 pivoted intermediate its ends, as shown at 13 and having its upper end located opposite one edge of a horizontal slide bar 14 provided in said edge with a cam recess 15. The last-mentioned end of the valve has an anti-friction roller 16 engaging the cam edge of the slide bar. When the bar 10 is reciprocated, the valve 12 is rocked by the movement of the roller 16 into and out of the recess 15. The valve 12 is backed by a spring 17 which tends to urge its upper end toward the bar 14, so that when the recess 15 comes opposite the roller 16, the latter enters the recess and the upper end of the valve therefore tilts forward, whereupon its rear end tilts back to open position, and allows the seed resting thereon to drop. In the bar 14 is an opening 18, which latter, when the valve is in closed position, registers with the outlet 19 of the seed box 9 into the chute 10, and allows the seed to drop down the chute onto the valve. The bar 14 then moves back to cover the outlet 19, shutting off the flow of seed to the valve, and the latter now opens and allows the seed resting thereon to drop to the ground. The area of the opening 18 may be varied by a slide 20 carried by the bar 14, thereby regulating the quantity of seed delivered to the valve at each operation.

It will be understood that the seed dropping mechanism just described is the same in both seed boxes 9, and both are operated by the bar 14, the latter extending through both boxes.

The following means are provided for operating the slide bar 14:

To one of the wheels 6 is fixed a toothed clutch ring 21, and opposite the same, is a clutch ring 22 which is fixed to a pair of tappet arms 23 extending radially outward, from a hub 24 slidably mounted on the axle 7. When the hub 24 is slid toward the wheel 6 to bring the clutch rings 21 and 22 into engagement, the arms 23 revolve with the wheel. At the side, the outer ends of the arms 23 carry rollers 25 into the path of which extends a lateral bend or crank arm 26 on one end of a rock shaft 27 journaled in bearings 28 carried by one of the seed boxes 9. A rocker arm 29 is fixed at one end to the shaft 27 and extends loosely through a slot 30 in the bar 14, and has connected to its lower end a spring 31 tending to draw the arm in one direction, and rock the shaft 27 in a direction to bring the crank arm 26 back into the path of the rollers 25.

In operation, the arms 23 being in motion, the rollers 25, one after the other, strike the crank arm 26, whereupon the shaft 27 is rocked, and when a roller slips off the crank arm, the shaft 27 is rocked by the spring 31 to swing the crank arm back into the path of the next approaching roller. The motion of shaft 27 is transmitted to the bar 14 through the arm 29, and the bar is reciprocated to operate the seed dropping mechanism hereinbefore described. The hub 24 has an opening 32 so that another tappet arm may be added if it is desired to drill the seed in hills twenty-one inches apart.

The tappet arms 23 can be swung out of gear by sliding the hub 24 to take the ring 22 out of engagement with the ring 21. This is done by a vertical shaft 33 carried by a support 34 on the frame 5, and having at its lower end an outstanding cam or finger 35 which is opposite an outstanding flange 36 on the inner end of the hub 24. Upon rotating the shaft 33 in a direction to crowd the cam 35 against the flange 36, the hub 24 slides inward on the axle 7 and the ring 22 is disengaged from the ring 21. A spring 37 engages the inner end of the hub 24 for forcing the same outward to re-engage the rings 21 and 22 when the shaft 33 is released.

The axle 7 on the other side of the machine carries a clutch ring 38 engaging a clutch ring 39 carried by marker arms 40 radiating from a hub 41 slidably mounted on the axle. These marker arms are thrown into and out of gear by engaging and disengaging the rings 38 and 39, this being done by a mechanism similar to the one provided for the rings 21 and 22.

The wheel 6 to which the ring 21 is fixed is fast on the axle 7 and the other wheel is loose. The ring 38 is also fast on the axle, in view of which it will be seen that the tappet arms 23 and the marker arms 40 travel together. The bearings 28 carrying the rock shaft 27 are vertically adjustable to regulate the stroke of the bar 14 by varying the distance between the rock shaft and the point where the arm 29 connects with the bar 14.

The machine is also equipped with a seat 41 for the driver, a marker 42 to drive by, (shown partly broken away in Fig. 1), scrapers 43 for the wheels 6, and such other adjuncts as may be required, which need not be described in detail as they form no part of the present invention.

I claim:

In a planter, a seed slide bar, a rock shaft extending transversely of the seed slide bar, a rocker arm extending from said shaft and having an actuating engagement with the seed slide bar, said slide bar having an aperture through which the arm extends, a support for the rock shaft adjustable toward and from the seed slide bar to vary the distance between said shaft and the point of the actuating engagement between the slide bar and the rocker arm, an actuating means for the rock shaft, said shaft having a crank arm extending into the path of said actuating means and engageable thereby, and a spring for returning the crank arm into the path of the actuating means.

In testimony whereof I affix my signature.

THOMAS J. ELLISON.

Copies of this patent may be obtained for five cents each, by addressing the "Commissioner of Patents, Washington, D. C."